(12) United States Patent
Neelakant (10) Patent No.: US 9,223,489 B2
(45) Date of Patent: Dec. 29, 2015

(54) METHOD AND APPARATUS FOR GESTURE BASED COPYING OF ATTRIBUTES

(75) Inventor: Vineeth Neelakant, Bangalore (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 142 days.

(21) Appl. No.: 13/495,528

(22) Filed: Jun. 13, 2012

(65) Prior Publication Data

US 2013/0335335 A1 Dec. 19, 2013

(51) Int. Cl.
*G06F 3/0488* (2013.01)
*G06F 3/0486* (2013.01)

(52) U.S. Cl.
CPC .......... *G06F 3/0486* (2013.01); *G06F 3/04883* (2013.01)

(58) Field of Classification Search
CPC ............................ G06F 3/0488; G06F 3/04883
USPC .......................................................... 715/863
See application file for complete search history.

(56) References Cited

U.S. PATENT DOCUMENTS

| | | | | |
|---|---|---|---|---|
| 5,371,844 | A * | 12/1994 | Andrew et al. | 715/747 |
| 6,300,949 | B1 * | 10/2001 | Shudo et al. | 715/744 |
| 8,049,762 | B2 * | 11/2011 | Wells et al. | 345/581 |
| 8,265,704 | B2 * | 9/2012 | Nam | 455/566 |
| 2002/0109737 | A1 * | 8/2002 | Jaeger | 345/863 |
| 2003/0174174 | A1 * | 9/2003 | Fitzpatrick et al. | 345/809 |
| 2007/0061126 | A1 * | 3/2007 | Russo et al. | 703/24 |
| 2008/0036743 | A1 * | 2/2008 | Westerman et al. | 345/173 |
| 2009/0106680 | A1 * | 4/2009 | Brownholtz et al. | 715/769 |
| 2010/0005428 | A1 * | 1/2010 | Ikeda et al. | 715/863 |
| 2010/0100854 | A1 * | 4/2010 | Russell et al. | 715/863 |
| 2010/0211920 | A1 * | 8/2010 | Westerman et al. | 715/863 |
| 2010/0306705 | A1 * | 12/2010 | Nilsson | 715/835 |
| 2011/0007029 | A1 | 1/2011 | Ben-David | |
| 2011/0185300 | A1 * | 7/2011 | Hinckley et al. | 715/769 |
| 2011/0191719 | A1 * | 8/2011 | Hinckley et al. | 715/835 |
| 2012/0030570 | A1 * | 2/2012 | Migos | 715/702 |
| 2012/0102432 | A1 * | 4/2012 | Breedvelt-Schouten et al. | 715/823 |
| 2013/0019175 | A1 * | 1/2013 | Kotler et al. | 715/728 |

OTHER PUBLICATIONS

Chevenement, David, "Use 2 finger drag $ drop", http://www.beesapps.com/support/topic/use-2-finger-drag-drop/.*
Kevin William Brydon, "Architectural Sketching With Computer Graphics", A Thesis Submitted to the University of Manchester for the Degree of Master of Science in the Faculty of Engineering and Physical Sciences, 2007, 106 pgs.
Volker Roth et al., "Bezel Swipe: Conflict-Free Scrolling and Multiple Selection on Mobile Touch Screen Devices", CHI 2009, Apr. 4-9, 2009, Boston, Massachusetts, 4 pgs.

(Continued)

*Primary Examiner* — Reza Nabi
*Assistant Examiner* — Daniel Rodriguez
(74) *Attorney, Agent, or Firm* — Keller Jolley Preece (57) ABSTRACT

A method and apparatus for copying of attributes of user interface (UI) elements on a touch screen display is disclosed. The method comprises detecting a gesture of a plurality of predefined gestures made on a UI element displayed on a touch screen display, wherein the gesture selectively signifies at least one attribute to copy; determining a source UI element based on the gesture; determining the at least one attribute to copy based on the gesture; and applying the determined attribute from the source UI element to a target UI element displayed on the touch screen display.

19 Claims, 6 Drawing Sheets

(56) References Cited

OTHER PUBLICATIONS

Jason I. Hong et al., "Satin: A Toolkit for Informal Ink-Based Applications", UIST '00, San Diego, CA USA, pp. 63-72.

Mike Wu et al., "Gesture Registration, Relaxation, and Reuse for Multi-Point Direct-Touch Surfaces", Mitsubishi Electric Research Laboratories, Oct. 2005, 10 pgs.

\* cited by examiner

METHOD AND APPARATUS FOR GESTURE BASED COPYING OF ATTRIBUTES

BACKGROUND OF THE INVENTION

1. Field of the Invention

Embodiments of the present invention generally relate to user interface design and, more particularly, to a method and apparatus for gesture based copying of attributes.

2. Description of the Related Art

Software programmers design user interfaces for a variety of applications, such as for web page design. Designing the user interface of web pages involves formatting elements on a web page such as text blocks, labels, captions, input fields, and the like. User interface (UI) elements have attributes such as font, color, gradient, opacity, stroke style, and the like. Often, formatting a UI element (e.g. a target element) comprises copying attributes from another UI element (e.g. a source element) for consistency in web page design.

Currently, copying a desired attribute from one element to another element is accomplished through use of lengthy menu or other formatting operations, such as accessing a setting for the desired attribute of the source element, noting the attributed, and manually setting the attribute of the target element to be the same as the accessed setting of the source element.

For example, to set the height of a first element to be identical to a second element, a designer must access the dimension settings or properties of the second element, access the dimension settings of the first element, note the dimensions of the second element, and set the dimensions of the first element manually to be the same as the second element. Similarly, for applying a color attribute of a third element to the first element, the designer needs to access the color settings for the third element, access the color settings of the first element, and modify the color settings of the first element to those of the third element. For complex attributes, or for a high number of attributes, the number of steps involved for effecting a format operation on an element increases substantially. As a result, such a methodology for copying attributes is cumbersome and time consuming.

Therefore, there is a need for a method and apparatus for gesture based copying of attributes.

SUMMARY OF THE INVENTION

Embodiments of the present invention provide a method and apparatus for gesture based copying of attributes of user interface (UI) elements displayed on a touch screen display. In one embodiment, the method comprises detecting a gesture of a plurality of predefined gestures made on a source UI element displayed on a touch screen display, wherein the gesture selectively signifies at least one attribute to copy. A source UI element and attribute to be copied are determined based on the gesture. The attribute to be copied from the source UI element is applied to a target UI element.

While the method and apparatus is described herein by way of example for several embodiments and illustrative drawings, those skilled in the art will recognize that the method and apparatus for gesture based copying of attributes are not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for gesture based copying of attributes as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to. Additionally, as used herein, the word "video" refers generally to any multi-media object or data, and although in various embodiments of the invention may refer to only a video object (still, animated or moving), in other embodiments, may refer to a combination of both video and audio objects or an audio object alone.

DETAILED DESCRIPTION OF EMBODIMENTS

Embodiments of the present invention comprise a method and apparatus for gesture based copying of attributes. The embodiments read gestures made on a touch screen display to determine which attribute or set of attributes are to be copied from a source UI element to a target UI element. In some embodiments, the source UI element and the target UI element are elements in a single file created by an application. In some embodiments, the source UI element and the target UI element are elements defined in different files created by a same application. In some embodiments, a user selects the target UI element by performing a prolonged touch on a UI element of a user interface display. The prolonged touch causes a menu to appear, from which the user selects "Copy Attributes". This activates the method thereby putting the system into a copy mode. Once in copy mode, the method reads a gesture on a source UI element associated with an attribute, stores the attribute in a temporary file, continues to read gestures made on source UI elements associated with attributes and store the attributes in the temporary file until attribute selection is complete at which time all attributes selected for copying are applied to the target element.

The method reads gestures made on a UI element in the user interface to perform the copy attribute function. The UI element on which the gesture is initially made is the source UI element. The gesture represents which attribute of the source UI element is to be copied to the target UI element. For example, making a gesture of the symbol "f" on the touch screen display results in copying the font of the source UI element to the target UI element. A gesture of "c" results in copying the background color of the source UI element to the target UI element. A gesture of "w" results in copying the width of the source UI element to the target UI element. Gestures may define a set of attributes to be copied. For example, performing a box gesture on a source UI element may copy margin, padding, and border attributes to the target UI element. A gesture can be mapped to copy the background color and foreground color attributes to the target UI element. As the attributes are identified from the gesture, the attributes are stored on a computer clipboard or the application's internal memory for temporary storage. When the user has completed the selection of attributes to be copied, the user indicates that the selection of attributes is complete by selecting, for example, "Done" from a menu on the UI. All of the attributes stored on the clipboard (or in the application's internal memory) are then applied to the target UI element.

In another embodiment, a multi-touch based approach is used. That is, rather than gesturing by using a symbol, the method reads finger swipes applied to the touch screen. For example, when a user swipes two fingers from a first element to a second element, the first element is determined to be the source UI element and the second element is determined to be the target UI element. The two finger swipe causes an attribute to be applied from the source UI element to the target UI element. Thus, a two finger swipe initiated from, for example, a text region of the source UI element and ending on the target UI element applies the font of the source UI element to the target UI element. A two finger swipe initiated from a non-text region of the source UI element and ending on the target UI element applies the background color from the source UI element to the target UI element. Hence, attributes are copied without requiring a user to open a menu or programming file and manually define the attributes desired to be copied.

Various embodiments of an apparatus and method for gesture based copying of attributes are described. In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
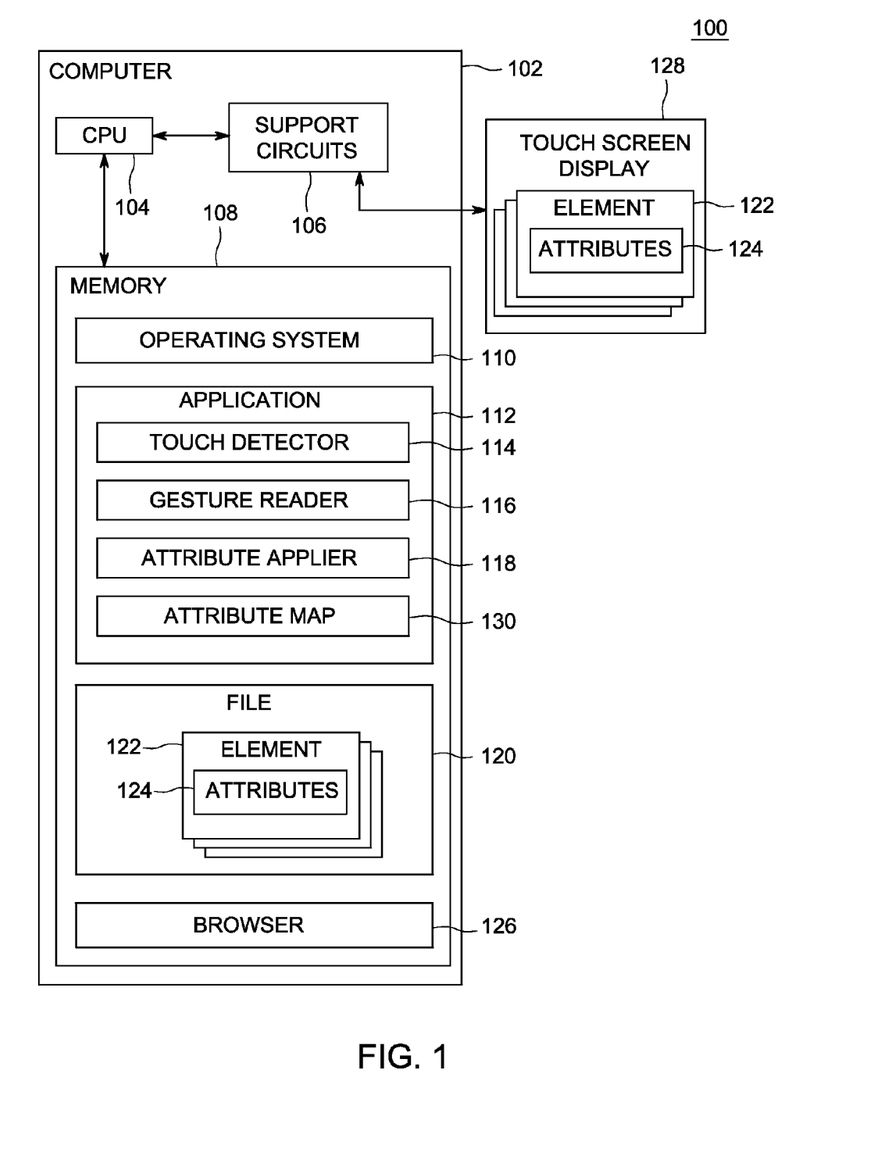
FIG. 1 depicts a block diagram of a system for copying attributes, according to one or more embodiments of the invention.

FIG. 1 depicts a block diagram of a system 100 for copying attributes according to one or more embodiments of the invention. The system 100 comprises a computer 102 and a touch screen display 128.

The computer 102 comprises a CPU 104, support circuits 106, and a memory 108. The computer 102 is a type of computing device (e.g., a laptop, a desktop, a Personal Digital Assistant (PDA) and/or the like). The CPU 104 may comprise one or more commercially available microprocessors or microcontrollers that facilitate data processing and storage. The various support circuits 106 facilitate the operation of the CPU 104 and include one or more clock circuits, power supplies, cache, input/output circuits, displays, and the like. The memory 108 comprises at least one of Read Only Memory (ROM), Random Access Memory (RAM), disk drive storage, optical storage, removable storage and/or the like. The memory 108 comprises an operating system 110, an application 112, a file 120, and a browser 126. The application 112 comprises a touch detector 114, a gesture reader 116, an attribute applier 118, and an attribute map 130. The file 120 comprises a plurality of User Interface (UI) elements 122. Each UI element 122 comprises a plurality of attributes 124. The attributes 124 are properties of a UI element, such as text font, width, color, opacity, transparency, and the like.

According to some embodiments of the invention, the operating system 110 generally manages various computer resources (e.g., network resources, file processors, and/or the like). The operating system 110 is configured to execute operations on one or more hardware and/or software modules, such as Network Interface Cards (NICs), hard disks, virtualization layers, firewalls and/or the like. Examples of the operating system 110 may include, but are not limited to, Linux, Mac OSX, BSD, UNIX, Microsoft Windows, and the like. The application 112 calls (accesses) commands associated with the operating system 110 (i.e., native operating system commands) to perform various operations, such as copying of attributes, executing the files and/or the like, as generally performed by software applications, such as ADOBE® DREAMWEAVER®, ADOBE® ILLUSTRATOR®, and ADOBE® INDESIGN® available from ADOBE Systems Incorporated, San Jose, Calif.

According to some embodiments, the file 120 may include HTML files, such as .html files or cascading style sheets, such as .css files, or any other type files that are created and processed by the application 112 and saved in the memory 108. The file 120 may further store a plurality of UI elements 122, each of which contains the plurality of attributes 124. In some embodiments a plurality of files (not shown) that are created by the application 112 may be open on the touch screen display 128.

According to some embodiments, a web page may be viewed within the application 112 using the browser 126. According to some embodiments, the browser 126 is utilized to run and view the file 120 on the touch screen display 128. The UI elements 122 are displayed on the touch screen display 128 in accordance with the UI element's attributes 124. Examples of browser 126 may include, but are not limited to, Firefox, Google Chrome, Internet Explorer, Opera, and Safari, Android browser, Firefox for mobile, Internet Explorer Mobile, among others.

The application 112 assigns one or more gestures to map to one or more attributes to be copied. The mapping is stored in the attribute map 130. According to some embodiments, the application 112 receives a command to copy attributes 124 from a source UI element to a target UI element. In some embodiments, the source UI element and the target UI element are elements contained in the same file 120 created by the application 112. In some embodiments, the source UI element and the target UI element are elements contained in separated files created by the application 112. A user performs a gesture on a UI element 122 on the touch screen display 128. The touch detector 114 determines which UI element 122 is the source UI element. The gesture reader 116 determines which attribute 124 is selected to be applied from the source UI element based on a mapping defined in the attribute map 130. The gesture is interpreted to determine the associated attribute 124 that is to be applied. In some embodiments, the attributed applier 118 stores the associated attributes 124 on a computer clipboard or in the application's internal memory as they are selected. In such embodiments, when attribute selection is complete, the attribute applier 118 applies the selected attributes to the target UI element. In some embodiments, the attribute applier 118 applies the attributes as they are selected. The application 112 may include ADOBE® DREAMWEAVER®, ADOBE® ILLUSTRATOR®, and ADOBE® INDESIGN® available from Adobe Systems Incorporated, San Jose, Calif. or any design software capable of creating UI elements comprising attributes for devices with touch screen displays.

According to one or more embodiments of the invention using the gesture based technique, the application 112 receives a command based on a selection from a menu displayed on a target UI element of the touch screen display 128 to copy attributes 124. The touch detector 114 uses hit testing, well known to those skilled in the art, to detect the position of the gesture and determine the source UI element with which the position of the gesture coincides on the touch screen display 128. Once the source UI element is determined, the gesture reader 116 interprets the gesture on the touch screen display 128 and accesses the attribute map 130 to determine which attribute 124 is mapped to the gesture. As described previously, a single gesture may be mapped to one attribute or to a set of attributes that are to be copied. The attribute applier 118 stores the associated attribute(s) 124 on the computer clipboard or in the application's internal memory as they are selected. When attribute selection is complete, the attribute applier 118 applies the selected attributes stored on the computer clipboard (or in the application's internal memory) to the target UI element.

According to other embodiments of the invention using the gesture based technique, a multi-touch based approach is used for copying of attributes. In the multi-touch gesture based approach, a two finger swipe from a first UI element to a second UI element on the touch screen display, defines the source and target UI elements and the attribute to be copied. The touch detector 114 determines a point of impact on the touch screen display 128. The touch detector 114 uses hit testing, as described above, to detect the position of the point of impact of the two finger swipe and determine the source UI element with which the point of impact coincides on the touch screen display 128. The gesture reader 116 determines which attribute 112 is associated with the point of impact. The gesture reader 116 accesses the attribute map 130 to determine the attribute 124 or set of attributes mapped to the point of impact. For example, a point of impact on a text region may be mapped to font. A point of impact on a non-text region of an UI element may be mapped to the background color of the UI element. The attribute applier 118 applies the determined attribute(s) to the target UI element.

Figure 2:
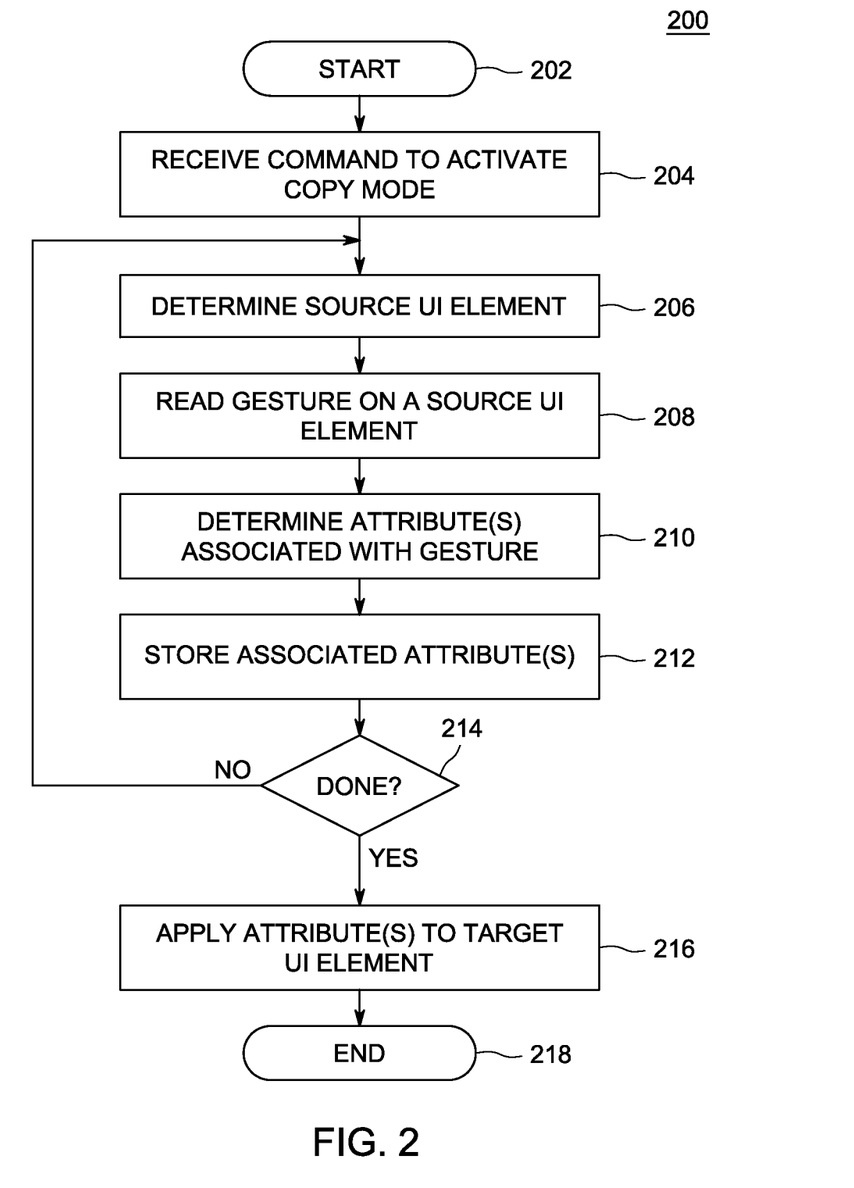
FIG. 2 depicts a flow diagram of a method for copying attributes using gesture based settings as performed by the application of FIG. 1, according to one or more embodiments of the invention.

FIG. 2 depicts a flow diagram of a method 200 for copying attributes using gesture based settings as performed by the application 112 of FIG. 1, according to one or more embodiments of the invention.

The method 200 starts at step 202, and proceeds to step 204. At step 204, the method 200 receives a command to activate copy mode. In one embodiment, the command may be selected from a drop down menu that appears on a displayed target UI element in response to a prolonged touch by the finger of a user on the target UI element as displayed on the touch screen. When the menu appears, the user may select "Copy Attributes". This command activates the copy mode. The method 200 proceeds to step 206.

At step 206, the method 200 determines a source UI element. The method 200 uses hit testing to determine the source UI element. Hit testing, well known to those skilled in the art, involves detecting a position of the gesture on the touch screen display and determining which UI element is located at the position of the gesture, i.e. which UI element is the source UI element. The method 200 proceeds to step 208.

At step 208, the method 200 reads a gesture made on a displayed source UI element. Each gesture is mapped to a corresponding attribute or set of attributes. In some embodiments, the gesture may be a trace of a symbol, such as the letter F (for font), C (for color), W (for width), O (for opacity), S (for box-shadow), or R (for border-radius) or the gesture may be a trace of a box (for the set of attributes comprising margin, padding, and border). Other gestures may be defined to map to an attribute or a set of attributes. The method 200 proceeds to step 210.

At step 210, the method 200 determines the attribute associated with the gesture read during step 208. The method 200 accesses an attribute map in memory to determine the associated attribute. As described previously, the gesture "f" may be associated with font of the text region of the UI element, while the gesture "w" may be associated with the width of the UI element. The method 200 proceeds to step 212.

At step 212, the attribute associated with the gesture is stored until the copy mode is deactivated. The attribute may be stored on a computer clipboard, internal memory, or other temporary storage area, hereafter referred to as internal memory. For example, if the gesture is mapped to the width of the source UI element, the internal memory may contain: "width:300px;". The method 200 proceeds to step 214. If the method 200 determines that there is no attribute associate with the gesture, the method 200 proceeds to step 214.

At step 214, the method 200 determines if the copying of attributes is completed. Copying of attributes is complete when the copy mode is deactivated. Copy mode is deactivated when the user selects, for example, "Done" from the drop down menu displayed on the target UI element. If at step 214, it is determined that the copying of attributes is not complete, then the method 200 proceeds to step 206. If a font is copied next at step 206, the internal memory may then contain: "width:300px; font-family: "Adobe Gardmond Pro";". If a background color is selected next, the internal memory may contain: "width:300px; font-family: "Adobe Gardmond Pro"; background: #729fcf;". The method 200 iterates until copy mode is deactivated. Each copied attribute is appended to the internal memory. If at step 214, it is determined that all attributes are copied, the method 200 proceeds to step 216.

At step 216, the method 200 applies the stored attributes from the internal memory to the target UI element. The attributes are saved with the target UI element and the display of the target UI element is updated to reflect the new attributes. The method 200 proceeds step 218 and ends.

Figure 3:
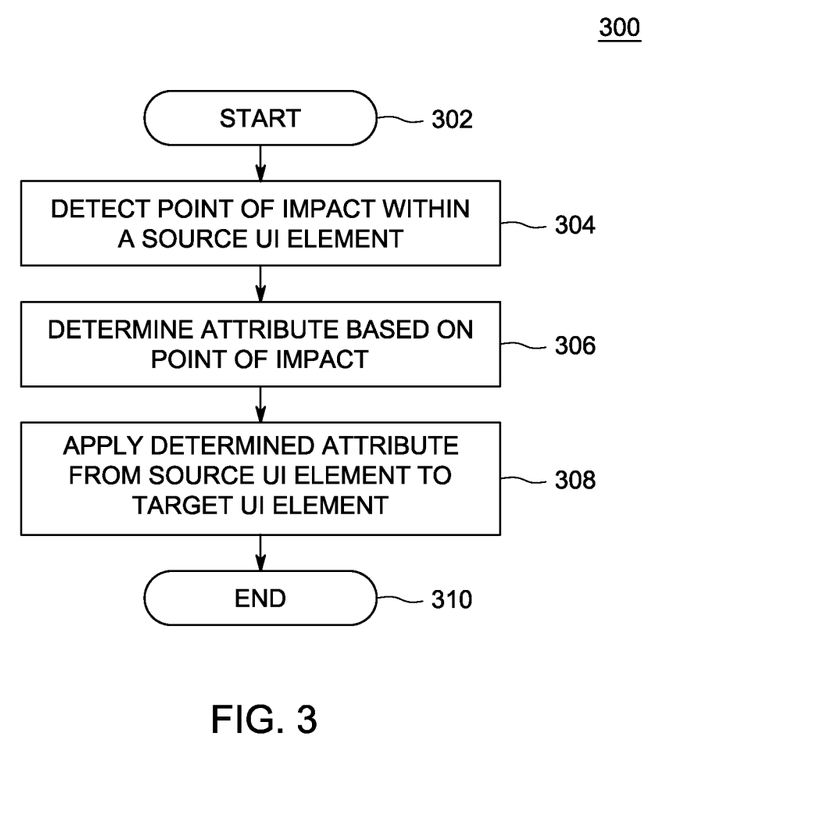
FIG. 3 depicts a flow diagram of a method for copying attributes using multi-touch approach as performed by the application of FIG. 1, according to one or more embodiments of the invention.

FIG. 3 depicts a flow diagram of a method 300 for copying attributes using a multi-touch gesture based approach, as performed by the application 112 of FIG. 1, according to one or more embodiments of the invention. In the multi-touch gesture based approach, the method 300 reads two finger swipes applied to the touch screen. Where the two finger swipe begins is referred to as the point of impact. Where the two finger swipe ends is referred to as the point of lift. When a user swipes two fingers from a first UI element to a second UI element, the point of impact of a touch within a UI element displayed on a touch screen determines the source UI element and the attribute to be copied. The point of lift of the touch from a displayed UI element on a touch screen determines the target UI element. Once the attribute is determined, that attribute is applied to the target UI element.

The method 300 starts at step 302, and proceeds to step 304. At step 304, the method 300 detects a point of impact. The method 300 uses hit testing. As described previously, hit testing involves detecting the location of the point of impact on the touch screen display thereby determining which UI element is located at the position of the gesture, i.e. which UI element is the source UI element. The method 300 proceeds to step 306. At step 306, the method 300 determines which attribute is to be copied based on the point of impact. For example, if the point of impact is on a text region in the source UI element, the attribute to be copied is the font. If the point of impact is on a non-text region of the source UI element, the attribute to be copied is the background color. If the point of impact is on an edge of the source UI element, the attribute to be copied is the border. These examples are purely illustrative. A point of impact may be defined by a software designer to represent any attribute or set of attributes to be copied. The method proceeds to step 308.

At step 308, the method 300 applies the determined attribute from the source UI element to a target UI element. The target UI element is determined to be the displayed UI element on which the point of lift is detected on the touch screen display. The point of lift is determined using hit testing as described above. The determined attribute is then applied to the target UI element and the display of the target UI element is updated to reflect the changed attribute. If the point of lift occurs outside of any UI element, no action is taken. The method 300 proceeds to step 310 and ends.

Figure 4A:
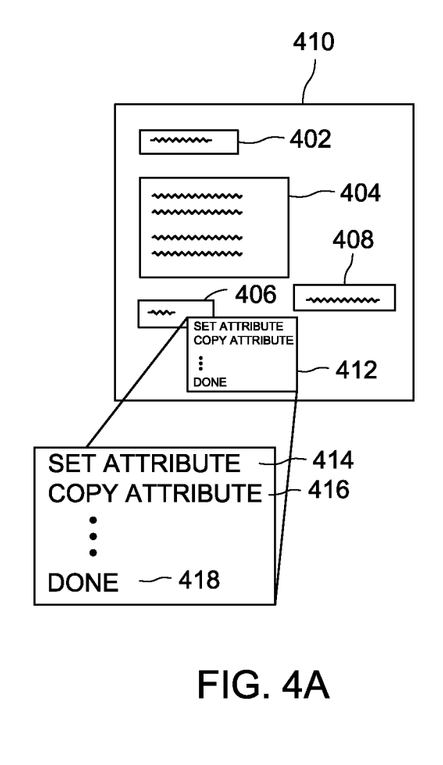
FIGS. 4A, 4B, and 4C depict a user interface for copying attributes on a touch screen display using a gesture based approach as performed by the method of FIG. 2 above, according to one or more embodiments of the invention.
Figures 4B, 4C:
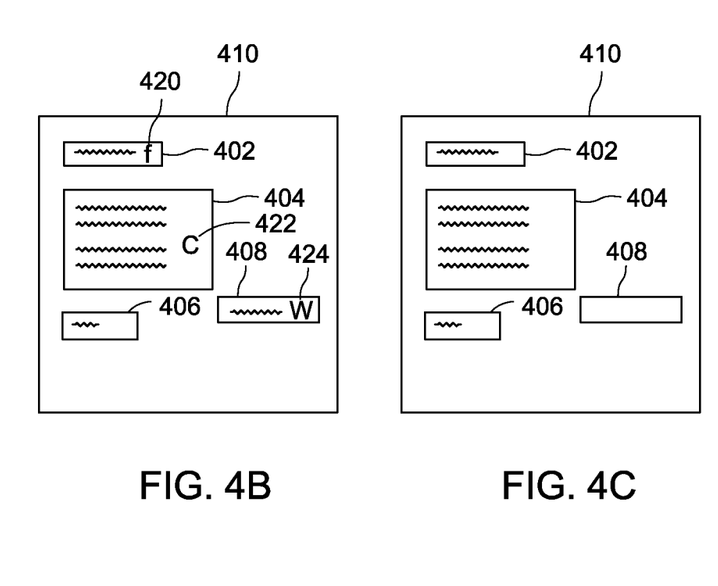

FIGS. 4A, 4B, and 4C depict a user interface for copying attributes on a touch screen display using the gesture based approach as performed by method 200 of FIG. 2 above, according to one or more embodiments of the invention. The figures are not drawn to scale and may be simplified for clarity.

FIG. 4A depicts a plurality of UI elements 402, 404, 406, and 408 on a touch screen display 410. Each of the plurality of UI elements 402, 404, 406, and 408 comprise a plurality of attributes including font, background color, gradient, width, and the like. When a user performs a prolonged touch on, for example, UI element 406, UI element 406 is designated the target UI element and a menu 412 appears. Menu 412 displays various menu options, such as Set Attributes 414, Copy Attributes 416, etc. The user selects the "Copy Attributes" option. After executing "Copy Attributes", the application enters into "copy mode".

FIG. 4B illustrates how attributes are copied using gestures made on UI elements. While in copy mode, the application detects gestures made on UI elements 402, 404, and 408, which UI elements become source elements upon detection of gestures made thereon. These gestures are assigned to corresponding attributes. In this example, the gesture "f" 420 made on UI element 402 stores the font of element 402 on an internal memory, or other temporary storage area. The gesture "c" 422 made on UI element 404 stores the background color of element 404 on the clipboard. The gesture "w" 424 made on UI element 408 stores the width of element 408 on the clipboard. The user selects a Done option 418 of the drop down menu which appeared on the target UI element when copying mode was activated. When the user selects the Done option, all attributes that are stored on the clipboard are applied to the target UI element 406; the element from which the "Copy attributes" menu option 416 was selected.

FIG. 4C depicts the UI elements after all copied attributes have been applied to the target UI element 406. The UI element 406 now has the font of UI element 402, the background color of UI element 404, and the width of UI element 408.

Figure 5A:
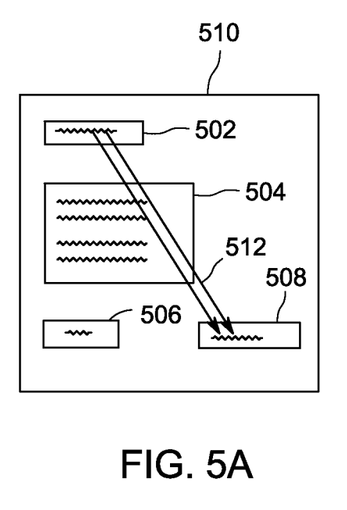
FIGS. 5A and 5B depict exemplary UI elements on a touch screen, which may be modified using the multi-touch gesture based approach as performed by the method of FIG. 3 above, according to one or more embodiments of the invention.
Figure 5B:
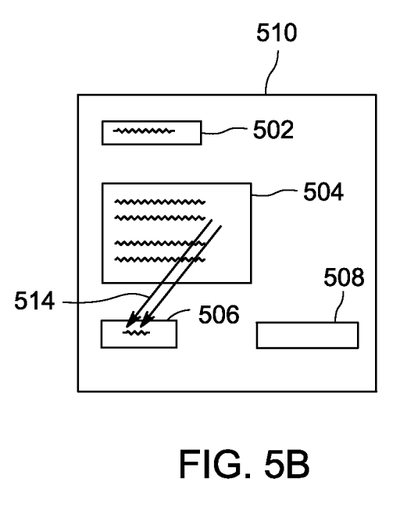

FIGS. 5A and 5B depict UI elements on a touch screen, which may be modified using the multi-touch gesture based approach as performed by the method 300 of FIG. 3 above, according to one or more embodiments of the invention. FIGS. 5A and 5B illustrate various interfaces for copying of attributes via the multi-touch based approach. The figures are not drawn to scale and may be simplified for clarity.

In the multi-touch based approach, the point of impact within a UI element on the touch screen display determines the source UI element and the attribute to be copied. A point of lift within a UI element on the touch screen display determines the target UI element to which the attribute is to be applied. A two finger swipe gesture by the user on the touch screen, illustrated by a pair of arrows determines the point of impact and point of lift.

FIG. 5A depicts UI elements 502, 504, 506, and 508 on a touch screen display 510. Each of the UI elements 502, 504, 506, and 508 comprises a plurality of attributes such as font, background color, width, gradient, and the like. In this example, a two finger swipe 512 begins on UI element 502 and ends on UI element 508. The point of impact occurs on the text component of the UI element 502, thus designating UI element 502 as the source UI element and the associated attribute as the font. The point of lift in this example is the UI element 508, thus designating element 508 as the target UI element. The font of UI element 502 is immediately copied to UI element 508.

FIG. 5B depicts another example of the multi-touch based approach, where in this example the two finger swipe 514 begins on UI element 504 and ends on UI element 506. The point of impact is a non-text region of UI element 504. Here, the point of impact reflects the background color attribute of UI element 504. The user simply drags two fingers to a desired target element 506, as shown by the double arrow 514. The background color of UI element 506 is changed to be the same as the background color of source UI element 504.

In some other embodiments, the user can also set the swipe gesture to be coupled with determining a number of point contacts associated with the swipe, as a shortcut to apply the gesture. For example, a two finger swipe for applying the font, and a three finger swipe for applying the color and so forth. By setting shortcuts, the user can more easily and quickly apply frequently required attributes.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Example Computer System

Figure 6:
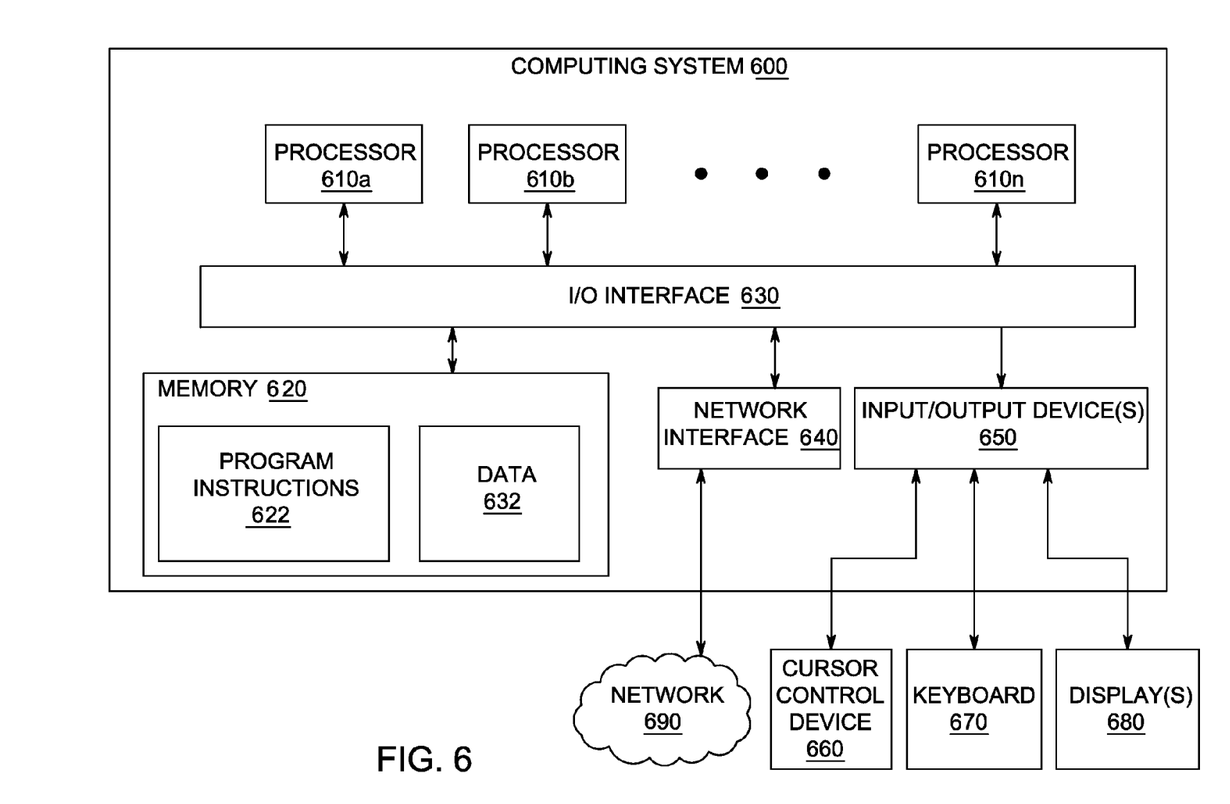
FIG. 6 depicts a computer system that can be utilized in various embodiments of the present invention, according to one or more embodiments of the invention.

FIG. 6 depicts a computer system that can be utilized in various embodiments of the present invention, according to one or more embodiments.

Various embodiments of method and apparatus for copying of attributes from a source UI element to a target element, as described herein, may be executed on one or more computer systems, which may interact with various other devices. One such computer system is computer system 600 illustrated by FIG. 6, which may in various embodiments implement any of the elements or functionality illustrated in FIGS. 1-5. In various embodiments, computer system 600 may be configured to implement methods described above. The computer system 600 may be used to implement any other system, device, element, functionality or method of the above-described embodiments. In the illustrated embodiments, computer system 600 may be configured to implement methods 200 and 300, as processor-executable executable program instructions 622 (e.g., program instructions executable by processor(s) 610) in various embodiments.

In the illustrated embodiment, computer system 600 includes one or more processors 610 coupled to a system memory 620 via an input/output (I/O) interface 630. Computer system 600 further includes a network interface 640 coupled to I/O interface 630, and one or more input/output devices 650, such as cursor control device 660, keyboard 670, and display(s) 680. In various embodiments, any of components may be utilized by the system to receive user input described above. In various embodiments, a user interface (e.g., user interface) may be generated and displayed on display 680. In some cases, it is contemplated that embodiments may be implemented using a single instance of computer system 600, while in other embodiments multiple such systems, or multiple nodes making up computer system 600, may be configured to host different portions or instances of various embodiments. For example, in one embodiment some elements may be implemented via one or more nodes of computer system 600 that are distinct from those nodes implementing other elements. In another example, multiple nodes may implement computer system 600 in a distributed manner.

In different embodiments, computer system 600 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs), such as the x96, PowerPC, SPARC, or MIPS ISAs, or any other suitable ISA. In multiprocessor systems, each of processors 610 may commonly, but not necessarily, implement the same ISA.

System memory 620 may be configured to store program instructions 622 and/or data 632 accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 620. In other embodiments, program instructions and/or data may be received, sent or stored upon different types of computer-accessible media or on similar media separate from system memory 620 or computer system 600.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one components (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network (e.g., network 690), such as one or more external systems or between nodes of computer system 600. In various embodiments, network 690 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 650 may, in some embodiments, include one or more display terminals, keyboards, keypads, touch pads, scanning devices, voice or optical recognition devices, or any other devices suitable for entering or accessing data by one or more computer systems 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

In some embodiments, the illustrated computer system may implement any of the methods described above, such as the methods illustrated by the flowchart of FIGS. 2-3. In other embodiments, different elements and data may be included.

Those skilled in the art will appreciate that computer system 600 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for gesture based copying of formatting attributes of user interface (UI) elements comprising:
 detecting a gesture, of a plurality of predefined gestures that are each mapped to a particular formatting attribute, made on a selected source UI element of potential source UI elements, wherein the gesture is mapped to a selected one formatting attribute to copy of a plurality of selectable formatting attributes;

determining the selected source UI element on which the gesture was detected;

identifying the selected one formatting attribute of the selected source UI element to copy signified by the gesture;

detecting selection of a target UI element, from a plurality of UI elements displayed on a touch screen display, on which to copy the selected one formatting attribute of the selected source UI element; and applying the selected one formatting attribute identified from the selected source UI element to the target UI element displayed on the touch screen display.

2. The method of claim 1, wherein detecting the gesture occurs in response to a command on the target UI element to copy a formatting attribute.

3. The method of claim 1, wherein detecting the gesture comprises determining a symbol drawn with a finger on the source UI element on the touch screen display.

4. The method of claim 1, wherein detecting the gesture comprises determining a point of impact of a finger on the touch screen display within the source UI element.

5. The method of claim 4, wherein determining the selected source UI element comprises detecting a region of the source UI element at the point of impact on the touch screen display.

6. The method of claim 5, wherein the target UI element is determined to be the UI element located at a point of lift of the finger from the touch screen display.

7. The method of claim 6, wherein applying the selected one formatting attribute is in response to performing a swipe with two fingers from the source UI element to the target UI element on the touch screen display.

8. A computer implemented method for gesture based copying of formatting attributes from source user interface (UI) elements to a target UI element comprising:

detecting selection of a target UI element, from a plurality of UI elements displayed on a touch screen display, on which to copy a formatting attribute of a selected source UI element, wherein upon detection of the target UI element selection, remaining UI elements of the displayed plurality of UI elements become selectable as potential source UI elements;

detecting a first gesture, of a plurality of predefined gestures that are each mapped to a particular formatting attribute, made on a first UI element displayed on the touch screen display, wherein the first gesture is mapped to a first selected one formatting attribute to copy of a plurality of selectable formatting attributes;

identifying the first UI element as a first selected source UI element based on the first gesture;

identifying the first selected one formatting attribute from the first selected source UI element to copy based on the first gesture;

detecting a second gesture, of the plurality of predefined gestures, made on a second UI element displayed on the touch screen display, wherein the second gesture is mapped to a second selected one formatting attribute to copy of a plurality of selectable formatting attributes;

identifying the second UI element as a second selected source UI element based on the second gesture;

identifying the second selected one formatting attribute from the second selected source UI element to copy based on the second gesture; and simultaneously applying the first selected one formatting attribute from the first selected source UI element and the second selected one formatting attribute from the second selected source UI element to the target UI element displayed on the touch screen display.

9. A non-transitory computer readable medium for storing executable code that, when executed by a processor, causes the processor to perform a method for copying of formatting attributes of user interface (UI) elements, the method comprising:

detecting selection of a target UI element, from a plurality of UI elements displayed on a touch screen display, on which to copy a formatting attribute of a selected source UI element;

detecting a first gesture, of a plurality of predefined gestures that are each mapped to a particular formatting attribute, made on a source UI element of the potential source UI elements displayed on the touch screen display, wherein the first gesture comprises a first gesture type, and wherein the first gesture type results in copying a first font formatting attribute from the source UI element; and detecting a second gesture, of the plurality of predefined gestures that are each mapped to a particular formatting attribute, made on the source UI element displayed on the touch screen display, wherein the second gesture comprises a second gesture type, and wherein the second gesture results in copying a background color formatting attribute from the source UI element.

10. The non-transitory computer readable medium of claim 9, wherein detecting the first gesture occurs in response to a command on the target UI element to copy a formatting attribute.

11. The non-transitory computer readable medium of claim 9, wherein the second gesture ends on the target UI element.

12. The non-transitory computer readable medium of claim 11, further comprising applying at least one of the font formatting attribute or the background color formatting attribute to the target UI element.

13. The non-transitory computer readable medium of claim 9, wherein detecting the first gesture comprises determining a point of impact of a finger on the touch screen display within the source UI element.

14. The non-transitory computer readable medium of claim 9, further comprising executable code, that when executed by the processor, causes the processor to detect a region of the source UI element at an initial point of impact of the first gesture on the touch screen display.

15. The non-transitory computer readable medium of claim 11, wherein the target UI element is determined to be the UI element located at a point of lift from the touch screen display.

16. The non-transitory computer readable medium of claim 9, wherein the first gesture type comprises performing a swipe with two fingers from the source UI element to the target UI element on the touch screen display.

17. A computer implemented method for gesture based copying of formatting attributes of user interface (UI) elements comprising:

detecting, by at least one processor, a gesture, of a plurality of gestures that are each mapped to a particular formatting attribute type, directed toward a source UI element, wherein the gesture is mapped to a formatting attribute type and wherein detecting the gesture comprises determining a symbol drawn over the source UI element on a touch screen display;

identifying, in response to detecting the gesture, a formatting attribute of the source UI element corresponding to the formatting attribute type mapped to the gesture;
detecting a selection of a target UI element; and
applying, by the at least one processor, the identified formatting attribute of the source UI element to the target UI element.

18. The method of claim 17, wherein detecting a selection of a target UI element comprises detecting a swipe gesture from the source UI element to the target UI element on a touch screen display.

19. The method of claim 17, wherein detecting the selection of the target UI element comprises receiving a command, with respect to the target UI element, to copy a formatting attribute.

* * * * *